US00RE46043E

(19) United States
(12) Reissued Patent
Stackenwalt et al.

(10) Patent Number: US RE46,043 E
(45) Date of Reissued Patent: Jun. 28, 2016

(54) CANOPY-LIKE DECORATIVE STRUCTURE

(71) Applicant: AWI Licensing Company, Wilmington, DE (US)

(72) Inventors: Richard D. Stackenwalt, Marietta, GA (US); Eric Krantz-Lilienthal, Lancaster, PA (US); Wesley T. K. Bischel, Lanscaster, PA (US); Martin L. Graver, Lancaster, PA (US); James F. Mathis, Lancaster, PA (US)

(73) Assignee: AWI Licensing LLC, Wilmington, DE (US)

(21) Appl. No.: 14/247,826

(22) Filed: Apr. 8, 2014

Related U.S. Patent Documents

Reissue of:
(64) Patent No.: 8,015,765
Issued: Sep. 13, 2011
Appl. No.: 12/783,834
Filed: May 20, 2010

U.S. Applications:
(63) Continuation of application No. 10/774,234, filed on Feb. 5, 2004, now abandoned, which is a continuation of application No. PCT/US02/23040, filed on Jul. 19, 2002.

(60) Provisional application No. 60/306,516, filed on Jul. 19, 2001.

(51) Int. Cl.
*E04B 1/00* (2006.01)
*E04B 9/04* (2006.01)
*E04B 9/34* (2006.01)

(52) U.S. Cl.
CPC ..... *E04B 9/0414* (2013.01); *E04B 9/0428* (2013.01); *E04B 9/34* (2013.01)

(58) Field of Classification Search
CPC ..... E04B 9/0414; E04B 9/0428; E04B 9/34
USPC ..... 52/506.01, 506.07, 222, 22, 506.06, 52/506.08, 585.1, 291; 403/294, 297, 326, 403/327, 328, 360; 135/95, 115, 117, 119, 135/120.4, 123, 906
See application file for complete search history.

(56) References Cited

U.S. PATENT DOCUMENTS

| | | | | | |
|---|---|---|---|---|---|
| 1,583,039 | A | * | 5/1926 | Wickstrum | 135/136 |
| 2,693,195 | A | * | 11/1954 | Frieder et al. | 135/122 |
| 2,735,522 | A | * | 2/1956 | Lee | 52/506.06 |
| 3,254,462 | A | | 6/1966 | Toler | |
| 3,344,564 | A | * | 10/1967 | Siegal | 52/11 |
| 3,386,220 | A | * | 6/1968 | Staats | 52/777 |
| 3,390,495 | A | | 7/1968 | Dalby | |
| 4,083,153 | A | | 4/1978 | Sumpter | |

(Continued)

FOREIGN PATENT DOCUMENTS

| | | |
|---|---|---|
| EP | 1026338 | 8/2000 |
| EP | 1281819 | 5/2003 |

*Primary Examiner* — Patricia Engle
(74) *Attorney, Agent, or Firm* — Craig M. Sterner

(57) ABSTRACT

A decorative structure is provided that is suspended within a space and includes a flexible panel maintained in a flexed configuration. The decorative structure includes a cable that supports the flexible panel and that is connected to a biasing member. The biasing member cooperates with a portion of the flexible panel to maintain the panel in a flexed configuration. A method of configuring a decorative structure with a flexed panel is also provided.

42 Claims, 6 Drawing Sheets

(56) References Cited

U.S. PATENT DOCUMENTS

| | | | | | |
|---|---|---|---|---|---|
| 4,223,506 | A | * | 9/1980 | Blair et al. | 52/644 |
| 4,325,207 | A | | 4/1982 | Russell et al. | |
| 4,433,700 | A | | 2/1984 | Dohet | |
| 4,571,897 | A | * | 2/1986 | Kerr | 52/13 |
| 4,739,784 | A | * | 4/1988 | Fast | 135/117 |
| 4,860,504 | A | * | 8/1989 | Lawrence | 52/86 |
| 5,261,204 | A | | 11/1993 | Neff | |
| 5,595,233 | A | * | 1/1997 | Gower | 160/232 |
| 5,622,197 | A | * | 4/1997 | Valaire | 135/90 |
| 6,134,848 | A | * | 10/2000 | Walter | 52/63 |
| 7,406,802 | B2 | * | 8/2008 | Stackenwalt et al. | 52/222 |
| 2002/0152704 | A1 | | 10/2002 | Thompson et al. | |

* cited by examiner

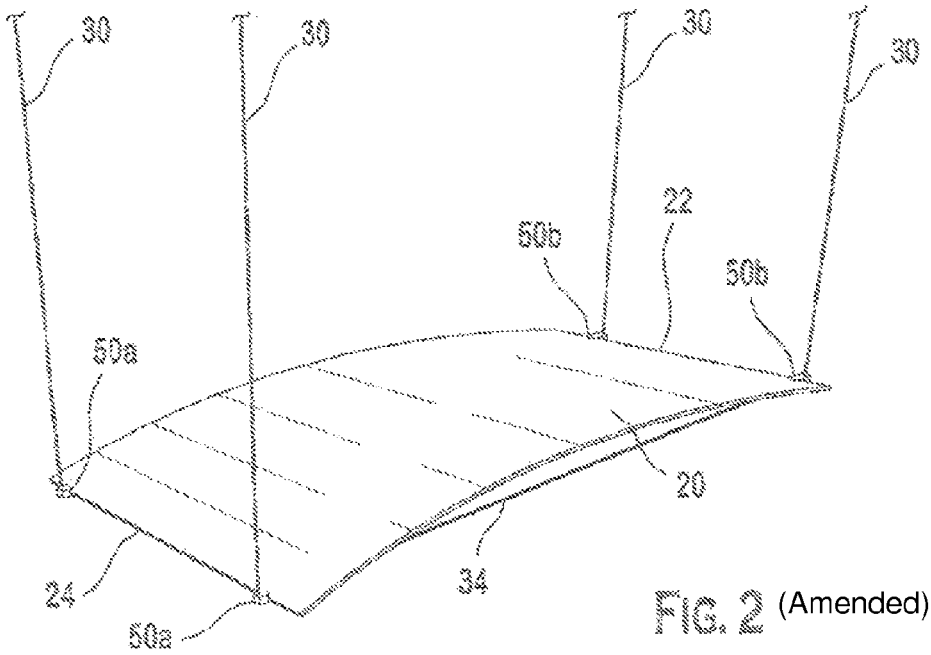
FIG. 2 (Amended)

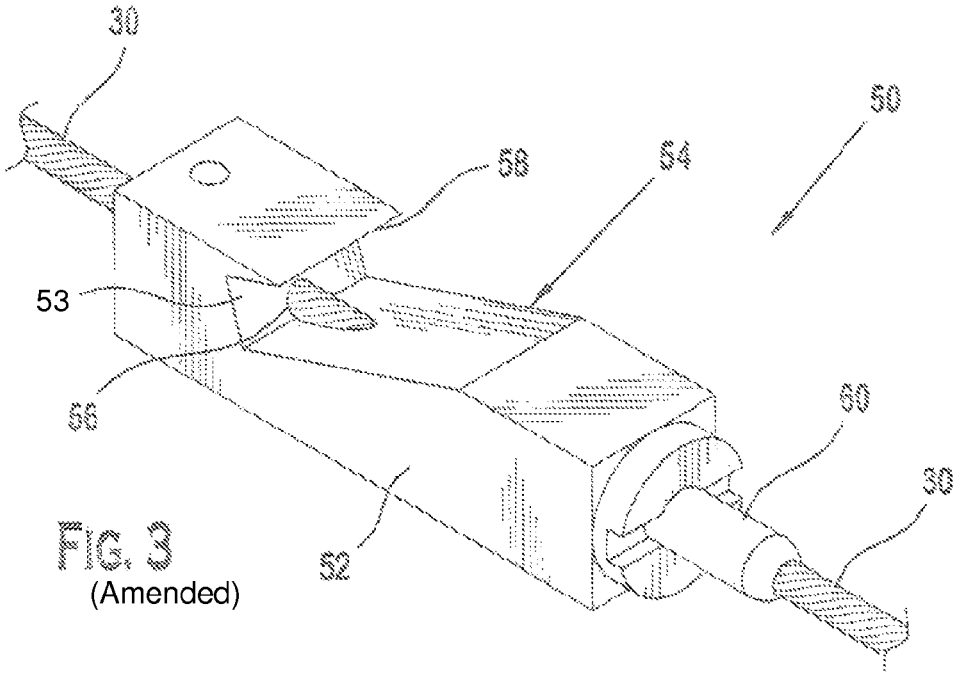
FIG. 3
(Amended)

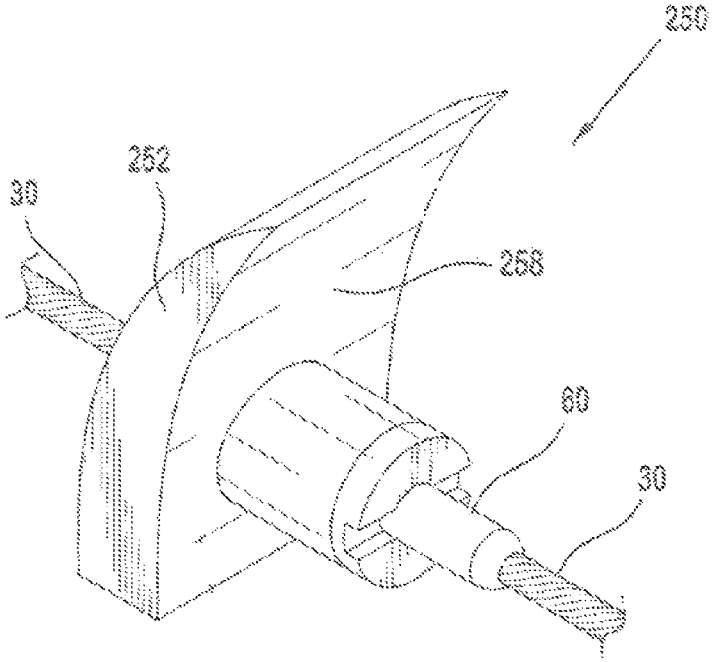
FIG. 5
(Amended)

FIG. 12
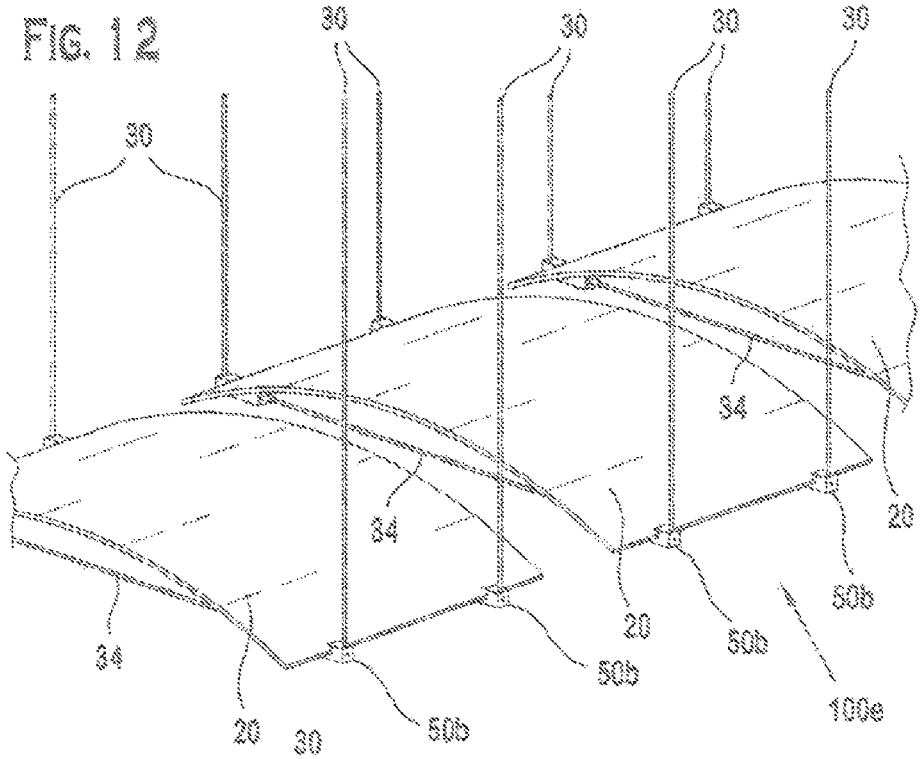
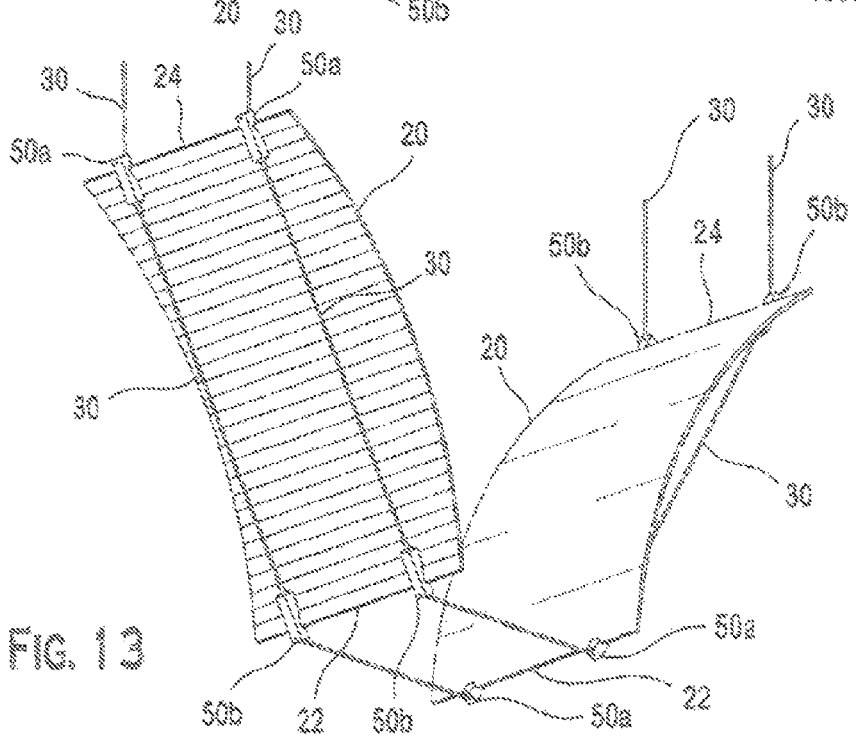
FIG. 13

CANOPY-LIKE DECORATIVE STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[Continuation] *The present application is a reissue of U.S. Pat. No. 8,015,765, filed May 20, 2010 and issued Sep. 13, 2011, which is a continuation* of *U.S.* application Ser. No. 10/774,234, filed on Feb. 5, 2004, now abandoned, which [claims the benefit] *is a continuation under 35 U.S.C. §§120, 365(c)* of international application serial no. PCT/US02/23040, filed on Jul. 19, 2002, designating the United States and published in English, which claims the benefit under 35 U.S.C. §119(e) of U.S. provisional patent application Ser. No. 60/306,516, filed on Jul. 19, 2001, *the entireties of which are hereby incorporated by reference.*

BACKGROUND

The present invention relates generally to ceiling fixtures and, more particularly, to ceiling fixtures for suspension from a hard ceiling in an open plenum space.

Traditional suspended ceiling structures formed from suspended grids of acoustically absorbent tiles are commonly found in commercial work spaces such as professional offices. While such structures provide a pleasant and acoustically absorbent space, designers and architects who desire to create the feel of an open loft space often object to the uniformity and lowered ceiling height created by conventional drop ceilings. Thus, more and more businesses are opting for so-called open plenum ceiling designs. In the open plenum, no suspended ceiling is provided that screens the entire hard deck or hard ceiling along with the HVAC duct work, wiring and the like. Rather, these structural elements are exposed. Open plenum ceilings are more commonly found in retail stores and similar commercial settings, but also can be found in office spaces.

In office spaces where open plenum ceilings are found, individual offices within the office space often are created using reconfigurable partitions that may be considerably lower than the hard ceiling. Whether in an office space or some other in-door space, the combination of an open plenum design with partitions that do not rise to the ceiling hard deck tends to leave the space unstructured and, consequently, less useful and aesthetically pleasing than it might otherwise be with some decorative structure that helps to define and differentiate the space.

To differentiate a space and to create a more interesting visual in a loft style space or open plenum design, architects sometimes will specify that an open loft space be provided with customized decorative structures suspended from the ceiling to differentiate the space within the room. Such suspended decorative structures not only can delineate the space but also may dampen extraneous noise and create an interesting visual. Unfortunately, such decorative structures must be preformed into the desired shape, thus making them difficult to ship or mass produce. Consequently, such decorative structures tend to be made only as customized pieces. Such customization leads to considerable expense to fabricate such a suspended decorative structure and its framing.

Therefore, there is a need for a decorative structure that can be suspended within a space and that is structured such that its elements can be easily interchanged to provide a variety of configurations with basic elements some of which, at least, may be mass produced.

SUMMARY

The present invention provides a decorative structure including a flexible panel maintained in a flexed configuration. The decorative structure comprises a flexible panel supported by a cable that is connected to a biasing member. The biasing member cooperates with a portion of the flexible panel so as to maintain the panel in a flexed configuration. The structure is suspended within an interior and/or exterior space by direct or indirect connection with a wall, ceiling, floor or other support structure. The cable may connect the biasing member to an opposed biasing member that also cooperates with the flexible panel. Alternatively, the biasing member may be connected to an opposed biasing member by a tensioned cable. The cable may be attached directly to the biasing member or indirectly to the biasing member with a fastener. In one embodiment, the cable may pass through a portion of the biasing member.

In one embodiment, the decorative structure comprises a biasing member having a cam that cooperates with the flexible panel. The flexible panel may be indirectly supported by a cable that is connected to the biasing member. The biasing member may cooperate with an edge of the flexible panel so as to maintain the panel in a flexed configuration.

In another embodiment, the biasing member comprises a jaw that receives a portion of the flexible panel. The jaw may be pivotal about a pivot point or joint.

The decorative structure may comprise one or more flexible panels that are supported by the same cable or a plurality of panels supported by a plurality of cables. The flexible panels may be comprised of a range of materials such as, for example, metal, wood, paper, plastic and/or glass.

The present invention also encompasses a method of configuring a decorative structure. The method comprises providing a cable connecting a biasing member to an opposed biasing member; engaging the biasing member with a first portion of a flexible panel; engaging the opposed biasing member with a second portion of the flexible panel; and, adjusting the relative alignment of the biasing member and the opposed biasing member. The method may also comprise the step of securing the alignment of the biasing member along the cable relative to the opposed biasing member, such as with an anchor connected to the biasing member and cooperating with the cable, and/or tensioning a cable connecting a biasing member to an opposed biasing member.

These and other features of the present invention will become apparent upon reading the following detailed description, when taken in conjunction with the accompanying drawings that are briefly described as follows.

BRIEF DESCRIPTION OF THE DRAWINGS

FIG. 2 is a perspective view of an alternative configuration of the decorative structure of FIG. 1.

FIG. 3 is a perspective view of a biasing member for use in a decorative structure embodying principles of the present invention.

FIG. 5 is a perspective view of a further biasing member for use in a decorative structure embodying principles of the present invention.

FIG. 12 is a perspective view of yet another decorative structure embodying principles of the present invention.

FIG. 13 is a perspective view of still a further decorative structure embodying principles of the present invention.

DETAILED DESCRIPTION

Referring now in greater detail to the figures, wherein like numerals refer to like parts throughout the drawings, the present invention generally includes a decorative structure comprising a flexible panel supported by a cable and maintained in a flexed configuration by a biasing member. The decorative structure provides a canopy-like visual element to a space in which it is suspended. The decorative structure may be easily installed and reconfigured to suit the user. The elements of the decorative structure may be interchanged in order to provide different visual and aesthetic impact. The flexible panel may be provided in a variety of shapes, materials and finishes. The flexible panel may be formed of wood, paper, metal, plastic, glass or any other suitable material. The panel may be solid, mesh or include a variety of decorative designs or openings therein to provide the desired visual impact.

Figure 1:
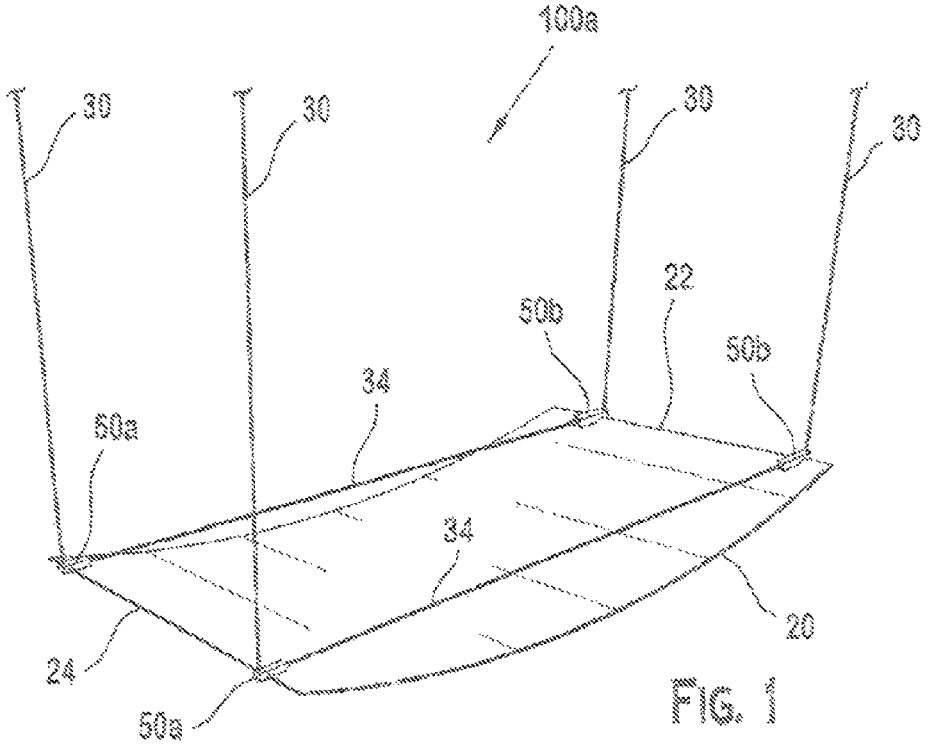
FIG. 1 is a perspective view of a decorative structure embodying principles of the present invention.

A decorative structure 100a is shown in FIG. 1. The decorative structure 100a includes a flexible panel 20 having a first edge 24 and a second edge 22. The decorative structure 100a also includes cables 30 connected to biasing members 50a and 50b and supporting flexible panel 20. Cables 30 are connected to the ceiling, walls or some other suitable structure from which the decorative structure 100a may be suspended. Biasing members 50a cooperate with a portion of flexible panel 20, such as, for example, first edge 24. Likewise, opposed biasing members 50b cooperate with second edge 22 of flexible panel 20. The cooperation of biasing members 50a with first edge 24 of flexible panel 20 and opposed biasing members 50b with second edge 22 provides support for the flexible panel and maintenance of the flexible panel 20 in a flexed configuration. Each biasing member 50a is connected to an opposed biasing member 50b by tensioned cable 34. Tensioned cable 34 provides a counter force through biasing members 50a and opposed biasing members 50b to the flexible panel 20 when it is in a flexed configuration. By employing tensioned cables 34 and biasing members 50a and opposed biasing members 50b, an otherwise flat but flexible panel 20 may be bowed to a desired configuration when decorative structure 100a is installed. Therefore, production, shipping and handling of the elements of the decorative structure may prove easier than with a customized structure having a preformed curved configuration.

As shown in FIG. 2, alternative configurations for flexible panel 20 can be had. In this embodiment of the present invention, tensioned cables 34 are positioned below flexed panel 20. As in decorative structure 100a, cables 30 are connected to biasing members 50a and opposed biasing members 50b, thereby at least indirectly supporting flexible panel 20, which cooperates with both biasing member 50a and opposed biasing members 50b. Thus, the present invention encompasses flexible panels that can be configured concave and/or convex.

Figure 4:
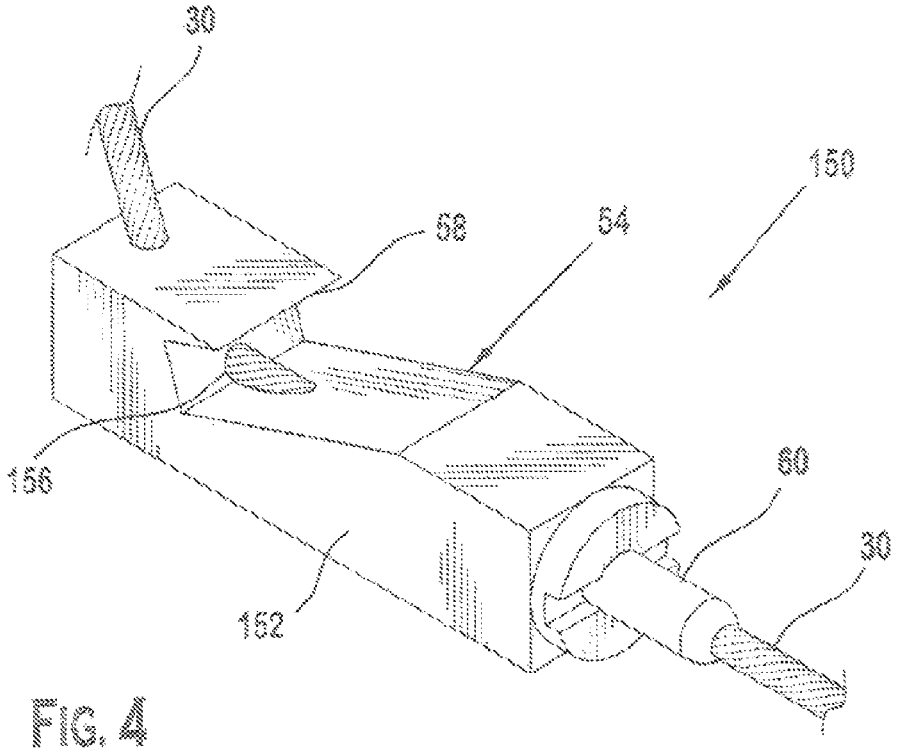
FIG. 4 is a perspective view of another biasing member for use in a decorative structure of embodying principles of the present invention.

FIG. 3 shows a biasing member 50 that embodies principles of the present invention. Biasing member 50 includes a body 52 that has a groove 54 formed therein. Groove 54 includes a major biasing surface 58. When an edge of a flexible panel is received by groove 54 major biasing surface 58 cooperates with a face of the flexible panel while the end surface 53 of groove 54 cooperates with an edge of the flexible panel so that the panel is biased in a predetermined direction. The flexible panel received by groove 54 may include a notch (not shown) in an edge thereof that may receive cable 30, when a portion of the cable extends through the groove 54 as shown in FIGS. 3 and 4. Biasing member 50 is connected to cable 30, which supports both the biasing member and any panel that may be cooperating with the biasing member. As shown in FIG. 3, support cable 30 may extend through the body 52 of biasing member 50, which includes apertures 56 that receive the cable 30. Apertures 56 may be formed in the body 52 so that cable 30 extends through a portion of groove 54, as shown in FIG. 3, or, alternatively, they may be formed such that cable 30 does not extend through groove 54.

The present invention encompasses decorative structures that include separate support and tensioned cables, as well as decorative structures that include cables that perform the function of both support and tensioning. As shown in FIG. 3, cable 30 is connected to biasing member 50 in such a manner as to both support the biasing member and tension a flexed panel that is received in groove 54. Biasing member 50 may be adjustably positioned along the length of cable 30 by disengaging anchor 60 through which cable 30 extends and to which biasing member 50 is connected. In order to reposition biasing member 50, anchor 60 is adjusted so as to at least partially disengage from cable 30 so as to allow movement of both anchor 60 and biasing member 50 along the cable. Once biasing member 50 is placed in the desired position, anchor 60 may be adjusted to reengage cable 30 so as to hold biasing member 50 in place on cable 30. Biasing member 50 may be made of any appropriate durable material such as metal or a polymeric resin. Cable 30 and/or tensioned cable 34 may also be made of any appropriate material, such as metal, synthetic or natural polymers.

As shown in FIG. 4, a biasing member 150 may be provided with a decorative structure of the present invention so as to form an angle within cable 30. Biasing member 150 includes a body 152 that has an angled aperture 156 formed therein. Cable 30 is inserted through aperture 156 so that cable 30 is angled. Depending upon the desired configuration of the decorative structure of the present invention, angled [channel] *aperture* 156 may be formed at any appropriate angle. Furthermore, the present invention encompasses other interconnections of the biasing member and cable so as to provide an angle along the cable.

FIG. 5 shows yet another embodiment of a biasing member of the present invention. Biasing member 250 includes a body 252 generally formed as a cam. Cable 30 extends through a channel formed in body 252 and anchor 60. Body 252 includes a major cam or biasing surface 258 that cooperates with a portion of a flexible panel in order to bias the panel and maintain the panel in a flexed configuration.

Figure 6:
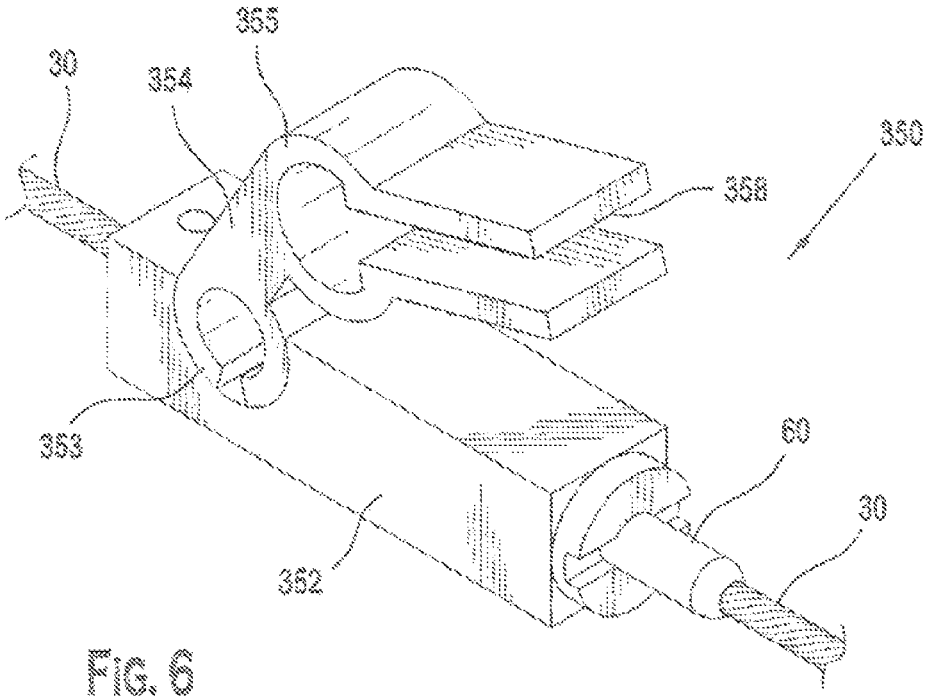
FIG. 6 is a perspective view of yet another biasing member for use in a decorative structure embodying principles of the present invention.

The present invention also encompasses a decorative structure that includes a biasing member having a jaw. FIG. 6 shows a biasing member 350 that includes a jaw 355 extending from a body 352 thereof. Jaw 355 is connected by a neck [351] *354* to a pivot joint 353 that allows for pivoting of the jaw 355. As with the other biasing members described above, jaw 355 includes a major jaw biasing surface 358 that cooperates with a portion of a flexible panel to both bias the panel and maintain it in a flexed configuration. Biasing member 350 is connected to an anchor 60 so that biasing member 350 may be adjustably positioned along the length of cable 30.

In each of the embodiments of the biasing member of the present invention described above, a cable may extend through a portion of the body of the biasing member as shown in FIGS. 3-6 or, alternatively, one or more cables may be connected to the biasing member by other means. For example, an eyelet (not shown) may be fastened to or formed in the biasing member. The cable may be connected to the eyelet. These and other fasteners connecting the biasing member to the cable are contemplated by the present invention.

Figure 7:
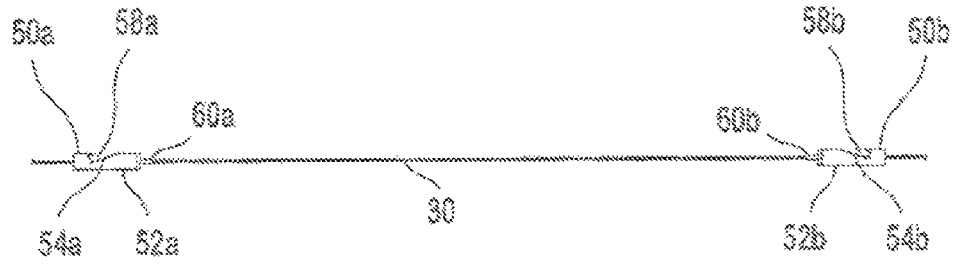
FIG. 7 is a side view of a portion of a decorative structure embodying principles of the present invention.
Figure 8:
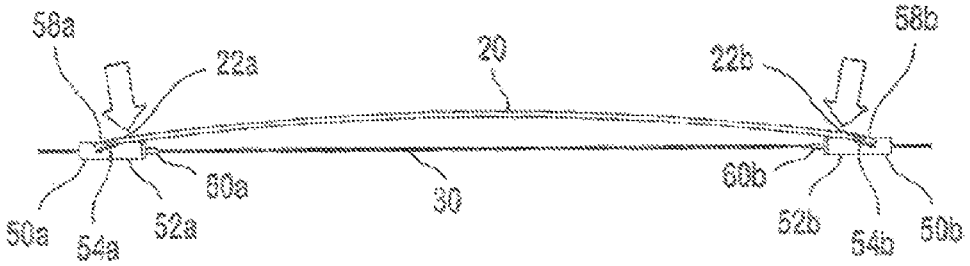
FIG. 8 is a side view of the portion of the decorative structure shown in FIG. 7 with the addition of a flexible panel.
Figure 9:
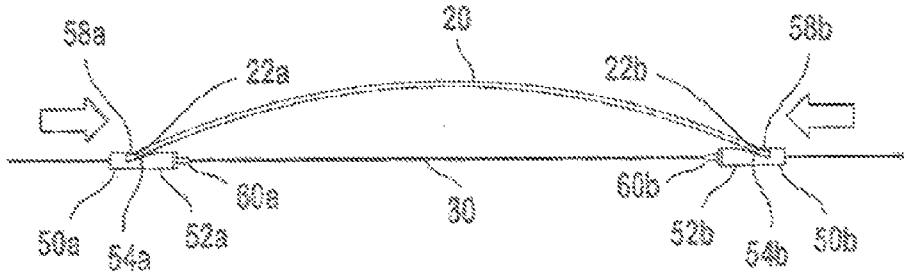
FIG. 9 is a side view of the portion of the decorative panel shown in FIG. 8 with the decorative structure adjusted to a desired configuration.
Figure 10:
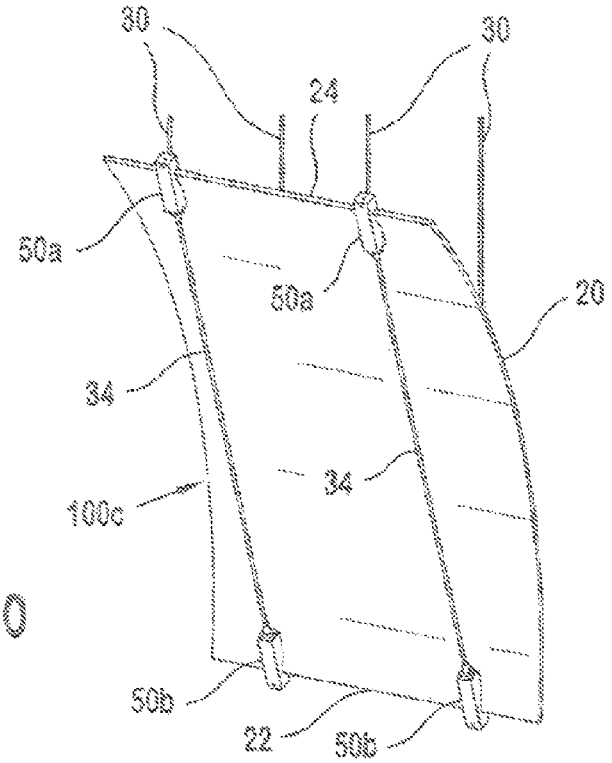
FIG. 10 is a perspective view of another decorative structure embodying principles of the present invention.

The present invention also encompasses a method for configuring a decorative structure. As shown in FIGS. 7-9, the method comprises the steps of providing a biasing member 50a connected to an opposed biasing member 50b by a cable 30, as shown in FIG. 7. The method further comprises engaging a portion of a flexible panel 20 with the biasing member 50a and engaging another portion of the flexible panel with the opposed biasing member 50b. For example, a first edge 22a of a flexible panel 20 may be inserted into groove 54a of biasing member 50a and a second edge 22b of flexible panel 20 may be inserted into a groove 54b of opposed biasing member 50b. If the biasing member and/or the opposed biasing member includes a jaw or a cam, then an edge or other portion of the flexible panel of the decorative structure may be inserted in the jaw or aligned adjacent the cam in order to accomplish these step. The alignment of the biasing member relative to the opposed biasing member then may be adjusted to bend the flexible panel into the desired flexed configuration. For instance, as indicated in FIG. 9, biasing member 50a and/or biasing member 50b may be moved along cable 30 thereby altering the extent of flexure of flexible panel 20.

When the desired configuration is achieved, the method may then include securing the biasing member and the opposed biasing member relative to the cable. For example, the anchors 60a and 60b connected to biasing members 50a and 50b respectively may be disengaged from cable 30 as the biasing members are repositioned and then reengaged with the cable when the desired alignment is achieved. The method may also include tensioning the cable in order to provide proper alignment of the biasing member relative to the opposed biasing member.

Figure 11:
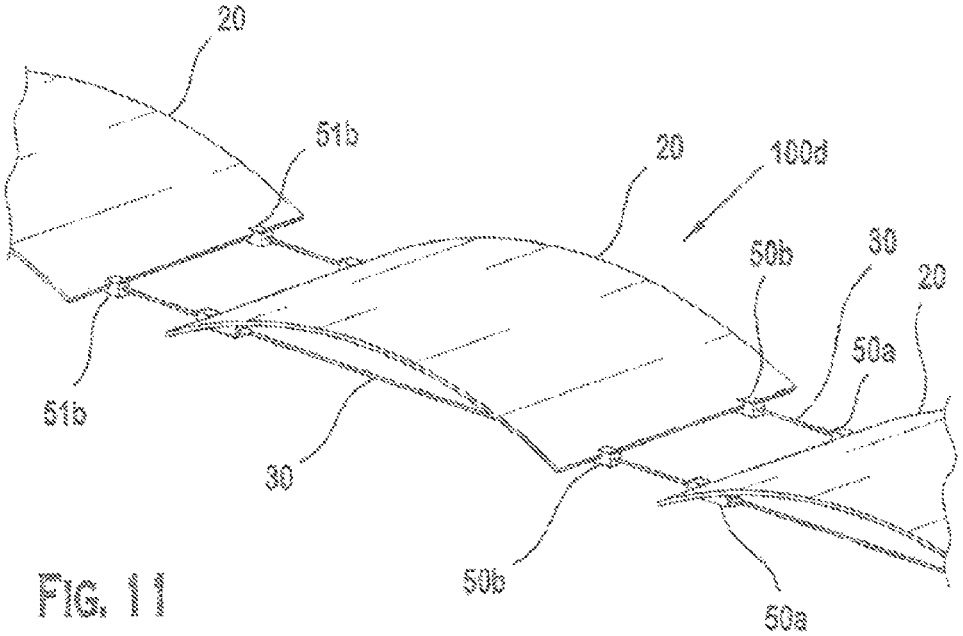
FIG. 11 is a perspective view of a further decorative structure embodying principles of the present invention.

As shown in FIGS. 10-13, the decorative structures of the present invention may include a variety of configurations and materials. For example, as shown in FIG. 11, two cables 30 may be aligned in parallel and a plurality of flexible panels 20 and biasing members 50 may be arranged thereon. In such a configuration, cables 30 serve both to support flexible panels 20 and provide the necessary tensioned counter force through the biasing members to maintain the flexible panels 20 in their respective flexed configurations. It is contemplated that a plurality of decorative structures may be provided in a given space and/or a decorative structure may include a plurality of configured flexible panels.

The decorative structure of the present invention also may provide hinged access to the space above the structure without completely disassembling the structure. The panel may be hingedly or pivotally rotated by loosening the anchors connected to one or more of the biasing members that engage a given panel. For example, in the case of decorative structure shown in FIG. 13, the anchors connected to biasing members 50b may be loosened so that the biasing members may be moved along the cables 30. Movement of the biasing members 50b will allow the panel 20a to be disengaged therefrom. The panel may then be rotated upward about an axis extending through biasing members 50a so that the space above the decorative structure may be accessed without removing portions of the structure.

As is shown in the figures, the ends of the flexible panel may be positioned at different heights and orientations relative to each other in order to provide a wide variety of visual and acoustical results. While the biasing members shown in the figures are completely supported by one or more cables, the present invention also encompasses decorative structures wherein one or more biasing members are supported by a structure other than a cable. For example, a biasing member may be supported by a rod, beam, pipe, wall, ledge or other suitable structure, while still functioning as intended according to the present invention.

Furthermore, the decorative structures of the present invention may be used in conjunction with a light source in order to illuminate the space in which the structure is suspended. The light may be integrally formed with the decorative structure, such as being supported by one or more of the structures cables, or be positioned adjacent the structure in order for the flexible panel to act as a reflector, diffuser or shade for a light source. These and many other modifications to the embodiments illustrated herein may well be made without departing from the spirit and scope of the present invention.

What is claimed is:

1. A suspended decorative structure comprising:

a flexible panel having opposed edges;

first and second biasing members cooperating with the opposed edges of the panel, each of the first and second biasing members include a body having a groove receiving one of the opposed edges of the panel;

a first cable attached to the first biasing member at a first end of the first cable and the second biasing member at a second end of the first cable, wherein the first cable cooperates with the first and second biasing members, causing the first and second biasing members to exert forces on the opposed edges of the flexible panel, causing the flexible panel to be bowed away from the first cable in either a concave or convex configuration;

a second cable attached to the first biasing member at a first end of the second cable and to [a wall or] an overhead ceiling at a second end of the second cable;

a third cable attached to *the* second biasing member at a first end of the third cable and to [a wall or an] *the* overhead ceiling at a second end of the third cable*; and wherein the flexible panel is suspended from the overhead ceiling in an interior space of a building*.

2. The suspended decorative structure of claim 1, wherein each of the first and second biasing members comprises a cam cooperating with the *flexible* panel.

3. The suspended decorative structure of claim 1, wherein each of the first and second biasing members comprises a jaw cooperating with [a] *the flexible* panel.

4. The suspended decorative structure of claim 3, wherein the jaw is pivotable about a pivot point.

5. The suspended decorative structure of claim 1, wherein the *flexible* panel is formed of a material selected from metal, wood, fabric and plastic.

6. The suspended decorative structure of claim 1, wherein the first cable is tensioned by the *flexible* panel.

*7. The suspended decorative structure of claim 1 wherein the flexible panel is formed of a plastic.*

*8. The suspended decorative structure of claim 1 wherein the flexible panel is suspended in an open plenum.*

*9. The suspended decorative structure of claim 1 further comprising:*

*the flexible panel suspended below the overhead ceiling; and*

*wherein the flexible panel is bowed away from the first cable in the concave configuration, the first cable positioned below the flexible panel.*

*10. The suspended decorative structure of claim 9 wherein the first cable is adjacent a concave bottom surface of the flexible panel.*

*11. The suspended decorative structure of claim 1 further comprising:*

*the flexible panel suspended in an open plenum space below the overhead ceiling;*

*wherein the flexible panel is bowed away from the first cable in the concave configuration, the first cable positioned below a concave bottom surface of the flexible panel; and*

*the second and third cables extending upward from a convex upper surface of the flexible panel.*

*12. The suspended decorative structure of claim 1 further comprising a first fastener attaching the first end of the second cable to the first biasing member and a second fastener attaching the first end of the third cable to the second biasing member.*

*13. The suspended decorative structure of claim 1 wherein the flexible panel is suspended from the overhead ceiling so that the opposed edges of the flexible panel are at different heights.*

*14. A suspended ceiling fixture comprising:*

*a flexible panel having opposed edges;*

*first and second biasing members cooperating with the opposed edges of the panel, each of the first and second biasing members include a body having a groove receiving one of the opposed edges of the panel;*

*a first cable attached to the first biasing member at a first end of the first cable and the second biasing member at a second end of the first cable,*

*wherein the first cable cooperates with the first and second biasing members, causing the first and second biasing members to exert forces on the opposed edges of the flexible panel, causing the flexible panel to be bowed away from the first cable in either a concave or convex configuration;*

*a second cable attached to the first biasing member at a first end of the second cable and to a wall or an overhead ceiling at a second end of the second cable;*

*a third cable attached to the second biasing member at a first end of the third cable and to a wall or the overhead ceiling at a second end of the third cable;*

*wherein the flexible panel is suspended in an open plenum in an interior space of a building below the overhead ceiling by the second and third cables.*

*15. The suspended ceiling fixture of claim 14 wherein the flexible panel is formed of a plastic.*

*16. The suspended ceiling fixture of claim 14 wherein the second end of the second cable is attached to the overhead ceiling and the second end of the third cable is attached to the overhead ceiling.*

*17. The suspended ceiling fixture of claim 14 wherein the flexible panel is bowed away from the first cable in the concave configuration, the first cable positioned below the flexible panel; and wherein the first cable is adjacent a concave bottom surface of the flexible panel.*

*18. The suspended ceiling fixture of claim 17 wherein the second and third cables extend upward from a convex upper surface of the flexible panel and are attached to the overhead ceiling.*

*19. The suspended ceiling fixture of claim 14 further comprising a first fastener attaching the first end of the second cable to the first biasing member and a second fastener attaching the first end of the third cable to the second biasing member.*

*20. The suspended ceiling fixture of claim 14 wherein the flexible panel is suspended in the open plenum below the overhead ceiling so that the opposed edges of the flexible panel are at different heights.*

*21. A suspended ceiling system comprising:*

*at least first and second suspended decorative structures, each of the first and second suspended decorative structures comprising:*

*a flexible panel having opposed edges;*

*first and second biasing members cooperating with the opposed edges of the panel, each of the first and second biasing members include a body having a groove receiving one of the opposed edges of the panel;*

*a first cable attached to the first biasing member at a first end of the first cable and the second biasing member at a second end of the first cable,*

*wherein the first cable cooperates with the first and second biasing members, causing the first and second biasing members to exert forces on the opposed edges of the flexible panel, causing the flexible panel to be bowed away from the first cable in either a concave or convex configuration;*

*a second cable attached to the first biasing member at a first end of the second cable and to a wall or an overhead ceiling at a second end of the second cable;*

*a third cable attached to the second biasing member at a first end of the third cable and to a wall or the overhead ceiling at a second end of the third cable; and*

*wherein the first and second suspended decorative structures are suspended in an edge-to-edge alignment in an open plenum within an interior space of a building below the overhead ceiling such that a first one of the opposed edges of the first suspended decorative structure is adjacent a second one of the opposed edges of the second suspended decorative structure.*

*22. The suspended ceiling system of claim 21 wherein for each of the first and second suspended decorative structures, the flexible panel is formed of a plastic.*

*23. The suspended ceiling system of claim 21 wherein for each of the first and second suspended decorative structures, the second end of the second cable is attached to the overhead ceiling and the second end of the third cable is attached to the overhead ceiling.*

*24. The suspended ceiling system of claim 21 wherein for each of the first and second suspended decorative structures, the flexible panel is suspended from the overhead ceiling in the interior space of the building.*

*25. The suspended ceiling system of claim 21 wherein for at least one of the first and second suspended decorative structures, the flexible panel is bowed away from the first cable in the concave configuration, the first cable positioned below the flexible panel; wherein the first cable is adjacent a concave bottom surface of the flexible panel; and wherein the second and third cables extend upward from a convex upper surface of the flexible panel and are attached to the overhead ceiling.*

*26. The suspended ceiling system of claim 21 wherein each of the first and second suspended decorative structures comprises a first fastener attaching the first end of the second cable to the first biasing member and a second fastener attaching the first end of the third cable to the second biasing member.*

*27. The suspended ceiling system of claim 21 wherein for at least one of the first and second suspended decorative structures, the flexible panel is suspended in the open plenum below the overhead ceiling so that the opposed edges of the flexible panel are at different heights.*

*28. The suspended ceiling system of claim 21 wherein a gap exists between the first one of the opposed edges of the first suspended decorative structure and the second one of the opposed edges of the second suspended decorative structure.*

*29. A suspended ceiling fixture comprising:*

*a flexible panel having opposed edges;*

*first and second biasing members cooperating with the opposed edges of the panel, each of the first and second biasing members include a body having a groove receiving one of the opposed edges of the panel;*

*a first cable attached to the first biasing member at a first end of the first cable and the second biasing member at a second end of the first cable,*

*wherein the first cable cooperates with the first and second biasing members, causing the first and second biasing members to exert forces on the opposed edges of the flexible panel, causing the flexible panel to be bowed away from the first cable in a concave configuration;*

*a second cable attached to the first biasing member at a first end of the second cable and to a wall or an overhead ceiling at a second end of the second cable;*

*a third cable attached to the second biasing member at a first end of the third cable and to a wall or the overhead ceiling at a second end of the third cable;*

*the first cable positioned adjacent and below a concave bottom surface of the flexible panel; and*

*wherein the flexible panel is suspended in an interior space of a building.*

*30. The suspended decorative structure of claim 1 wherein the flexible panel is bowed away from the first cable in a convex configuration so that a concave upper surface of the flexible panel faces the first cable, the first cable positioned above the concave upper surface of the flexible panel.*

*31. The suspended decorative structure of claim 30 wherein the second and third cables extend upwardly from the concave upper surface of the flexible panel.*

*32. The suspended decorative structure of claim 31 wherein the first, second, and third cables are located on the same side of the flexible panel.*

*33. The suspended decorative structure of claim 1 wherein the first, second, and third cables are located on the same side of the flexible panel.*

*34. The suspended decorative structure of claim 1 wherein a concave upper surface of the flexible panel faces the overhead ceiling.*

*35. The suspended ceiling fixture of claim 14 wherein the first cable is tensioned by the flexible panel.*

*36. The suspended decorative structure of claim 14 wherein the flexible panel is bowed away from the first cable in a convex configuration so that a concave upper surface of the flexible panel faces the first cable, the first cable positioned above the concave upper surface of the flexible panel.*

*37. The suspended decorative structure of claim 36 wherein the second and third cables extend upwardly from the concave upper surface of the flexible panel.*

*38. The suspended ceiling system of claim 21 wherein the first cable is tensioned by the flexible panel.*

*39. The suspended decorative structure of claim 21 wherein the flexible panel is bowed away from the first cable in a convex configuration so that a concave upper surface of the flexible panel faces the first cable, the first cable positioned above the concave upper surface of the flexible panel.*

*40. The suspended decorative structure of claim 39 wherein the second and third cables extend upwardly from the concave upper surface of the flexible panel.*

*41. The suspended ceiling fixture of claim 29 wherein the first cable is tensioned by the flexible panel.*

*42. The suspended decorative structure of claim 29 wherein the second and third cables extend upwardly from a convex upper surface of the flexible panel.*

* * * * *